United States Patent
Legg et al.

(10) Patent No.: US 6,414,947 B1
(45) Date of Patent: Jul. 2, 2002

(54) COMMUNICATION NETWORK AND METHOD OF ALLOCATING RESOURCE THEREFOR

(75) Inventors: Peter Jonathon Legg, Swindon; Stephen John Barrett, Devizes, both of (GB)

(73) Assignee: Motorola, Inc., Schaumburg, IL (US)

( * ) Notice: Subject to any disclaimer, the term of this patent is extended or adjusted under 35 U.S.C. 154(b) by 0 days.

(21) Appl. No.: 09/441,186

(22) Filed: Nov. 15, 1999

(30) Foreign Application Priority Data

Apr. 6, 1999 (GB) ............................................. 9907651

(51) Int. Cl.[7] ................................................ H04Q 7/00
(52) U.S. Cl. ......................... 370/331; 455/436; 455/442
(58) Field of Search ................................ 370/331, 332, 370/335, 340, 342, 350; 455/436, 437, 438, 439, 440, 442, 450, 452, 62, 507, 515, 514

(56) References Cited

U.S. PATENT DOCUMENTS 6,148,207 A * 11/2000 Baum et al. ................. 455/442
6,175,736 B1 * 1/2001 Lee et al. ..................... 370/331
6,198,929 B1 * 3/2001 Krishnamurthi ............. 455/442

FOREIGN PATENT DOCUMENTS

WO     WO96/08940     3/1996

\* cited by examiner

*Primary Examiner*—Thanh Cong Le

(57) ABSTRACT

A CDMA cellular communication system includes two base stations (403,405), which comprises resource allocation means (415,417) and communication means (411,413) for communicating over a radio interface to a user terminal (401). The user terminal (401) is in soft handover with the two base stations (403,405) and communicates using packet transmission. One of the base stations (403,405) is determined as associated base station by means for determining an associated cell (421,423). Initial resource scheduling is performed in the two base stations (403,405) only considering the soft handover user terminal (401) in the associated cell. The resource allocation is then communicated to the non-associated base station, which updates its resource allocation taking into account the soft handover user terminal (401). The invention is applicable to the UMTS communication system.

15 Claims, 4 Drawing Sheets

-PRIOR ART-

-PRIOR ART-

COMMUNICATION NETWORK AND METHOD OF ALLOCATING RESOURCE THEREFOR

FIELD OF THE INVENTION

This invention relates to a communication network and a method of allocating resource therefor, and in particularly to a CDMA cellular radio communication network and a method therefor.

BACKGROUND OF THE INVENTION

In a cellular communication system each of the user terminals (typically mobile stations) communicates with typically a fixed base station (base station transceiver—BTS). Communication from the user terminal to the base station is known as uplink and communication from the base station to the user terminal is known as downlink. The total coverage area of the system is divided into a number of separate cells, each predominantly covered by a single base station. The cells are typically geographically distinct with an overlapping coverage area with neighbouring cells. FIG. 1 illustrates a cellular communication system 100. In the system, a base station 101 communicates with a number of user terminals 103 over radio channels 105. In the cellular system, the base station 101 covers users within a certain geographical area 107, whereas other geographical areas 109, 111 are covered by other base stations 113, 115.

As a user terminal moves from the coverage area of one cell to the coverage area of another cell, the communication link will change from being between the user terminal and the base station of the first cell, to being between the user terminal and the base station of the second cell. This is known as a handover. Specifically, some cells may lie completely within the coverage of other larger cells.

All base stations are interconnected by a fixed network. This fixed network comprises communication lines, switches, interfaces to other communication networks and various controllers required for operating the network. A call from a user terminal is routed through the fixed network to the destination specific for this call. If the call is between two user terminals of the same communication system the call will be routed through the fixed network to the base station of the cell in which the other user terminal currently is. A connection is thus established between the two serving cells through the fixed network. Alternatively, if the call is between a user terminal and a telephone connected to the Public Switched Telephone Network (PSTN) the call is routed from the serving base station to the interface between the cellular mobile communication system and the PSTN. It is then routed from the interface to the telephone by the PSTN.

A cellular mobile communication system is allocated a frequency spectrum for the radio communication between the user terminals and the base stations. This spectrum must be shared between all user terminals simultaneously using the system.

One method of sharing this spectrum is by a technique known as Code Division Multiple Access (CDMA). In a Direct Sequence CDMA (DS-CDMA) communication system, the signals are, prior to being transmitted, multiplied by a high rate code whereby the signal is spread over a larger frequency spectrum. A narrowband signal is thus spread and transmitted as a wideband signal. At the receiver-the original narrowband signal is regenerated by multiplication of the received signal with the same code. A signal spread by use of a different code will at the receiver not be de-spread but will remain a wide band signal. In the receiver the majority of interference caused by interfering signals received in the same frequency spectrum as the wanted signal can thus be removed by filtering. Consequently a plurality of user terminals can be accommodated in the same wideband spectrum by allocating different codes for different user terminals. Codes are chosen to minimise the interference caused between user terminals typically by choosing orthogonal codes when possible. A further description of CDMA communication systems can be found in 'Spread Spectrum CDMA Systems for Wireless Communications', Glisic & Vucetic, Artech house Publishers, 1997, ISBN 0-89006-858-5. Examples of CDMA cellular communication systems are IS 95 standardised in North America and the Universal Mobile Telecommunication System (UMTS) currently under standardisation in Europe.

Typically, CDMA communication systems use a handover technique known as soft hand over. In a soft handover, a user terminal is simultaneously served by more than one base station. FIG. 2 illustrates the situation where a user terminal 201 is in soft handover with two base stations 203, 205 each covering a cell 207, 209. In the uplink the signal received at each base station 203, 205 is communicated to a controller 211 where the signals are combined and the received data is recovered. In the downlink the data to be transmitted to the user terminal is communicated from the controller to both base stations 203, 205 and both base stations simultaneously transmit the data to the user terminal 201. The user terminal 201 combines the two signals and demodulates the signal.

The quality of the radio communication between the user terminal and the base station is determined by the signal to noise level of the signals where the noise includes both thermal noise and interference noise. Other base stations and user terminals generate interference, which increases the noise level and thus reduces the quality. In order to attain an acceptable quality level the interference must thus be kept sufficiently low. A major technique for interference reduction in CDMA system is use of power control whereby the transmitted power of each user terminal and base station is maintained at the minimum level required for the signal to be received at an acceptable quality. Uplink power control can be implemented by the base station measuring the received signal quality and transmitting power up information to the user terminal when the signal quality is below an acceptable level, and power down information when the signal quality is above this level. Similarly, downlink power control can be implemented by the user terminal transmitting power up or power down information depending on the signal quality of the signal received at the user terminal.

In a communication system such as cellular communication systems, efficient resource control is essential for achieving the highest performance of the communication system. The communication thus comprises means for controlling the transmission of data services, allocating resources to different users, scheduling the transmission of data, providing error checks, determining serving base station etc.

The procedures and routines required for controlling data transmission in communication systems are typically considered in the frame of a layered logical structure where lower layers provide functionality to higher layers. The lowest layer is the physical layer which is responsible for communicating data bits over the radio communication links between base stations and user terminals. The physical layer thus provides a number of bit communication services to the next layer which is the MAC (Medium Access Control) layer. The MAC layer provides functionality for allocation of available resource to different users and for scheduling data transmissions to meet required quality of service. Above the MAC, the RLC (Radio Link Control) protocol allows retransmissions of errored data across the radio link. The Radio Resource Control sits above the RLC and covers functions including call admission, configuration of other entities (like the MAC and physical layer) and management of radio resources across multiple cells.

The resource allocation and data scheduling is a very complicated process where allocation in one cell may impact the performance in a different cell. This is specifically problematic for a communication network such as a CDMA network operating in soft handover where a specific user terminal may be served by several parallel communication links from different base stations. Hence, ideally, a resource allocation should consider conditions and resource requirements in all cells and perform a global optimisation in response to this. However, due to the complexity of such a resource allocation this is impractical for all but the simplest communication networks.

Conversely simply considering resource allocation based on a single cell is inefficient, if at all possible. As a specific example, if a user terminal receiving short data bursts is in soft handover with two cells, the data bursts are required to be transmitted substantially simultaneously from the two base stations. Allocation of resource independently in these two base stations is thus not possible. As there may simultaneously be many user terminals in soft handover and as the number and parameters for these soft handovers change frequently it is not feasible to define certain base stations as master base stations controlling the resource allocation of other slave base stations. This would lead to conflicts where for some soft handover scenarios the same base station would be required to be both a master and slave base station.

A low complexity system for allocating resource in a communication network having a plurality of communication links serving the same user terminal is thus advantageous.

SUMMARY OF THE INVENTION

The current invention seeks to provide a communication network having a low complexity system for allocating resource in a communication network having a plurality of communication links serving the same user terminal.

According to the present invention, there is provided a communication network comprising first resource allocating means for allocating resource in a first communication channel; second resource allocating means for allocating resource in a second communication channel; first communication means for providing a communication link for the first communication channel to at least one user terminal; second communication means for providing a communication link for the second communication channel to at least one user terminal; a first user terminal using both communication links for communication; means for determining an associated resource allocating means from said first or second resource allocating means for said first user terminal; and wherein said associated resource allocating means performs a first allocation of resource to said first user terminal without consideration of resource allocation in other resource allocating means and the resource allocating means not being associated resource allocation means subsequently performs a resource allocation to the first user terminal in response to the first resource allocation of the associated resource allocation means.

Preferably, the resource allocating means not being associated resource allocation means perform an initial resource allocation not considering resource allocation for the first user terminal, and the resource allocation to the first user terminal in response to the first resource allocation of the associated resource allocation means consist in modifying this initial resource allocation.

According to one feature of the invention the communication network is a CDMA cellular communication network and the first user terminal is in soft handover.

According to a different aspect of the invention, a method of allocating resource in a communication network having first resource allocating means for allocating resource in a first communication channel; second resource allocating means for allocating resource in a second communication channel; first communication means for providing a communication link for the first communication channel to at least one user terminal; second communication means for providing a communication link for the second communication channel to at least one user terminal; and a first user terminal using both communication links for communication; the method comprising the steps of: determining an associated resource allocating means from said first or second resource allocating means for said first user terminal; in said associated resource allocating means performing a first allocation of resource to said first user terminal without consideration of resource allocation in other resource allocating means communicating the first allocation of resource to the resource allocating means not being associated resource allocation means; and in the resource allocating means not being associated resource allocation means performing a resource allocation to the first user terminal in response to the first resource allocation of the associated resource allocation means.

The invention thus provide low complexity, fair and efficient means of scheduling resource to allow the many benefits of soft handover to be realised.

BRIEF DESCRIPTION OF THE DRAWINGS

An embodiment of the present invention is described below, by way of example only, with reference to the Drawings, in which.

DETAILED DESCRIPTION OF A PREFERRED EMBODIMENT

The following description focuses on an embodiment in a CDMA cellular communication system compliant with the current approach for the standardisation of UMTS, but it will be apparent that the invention is not limited to this application.

Figure 1:
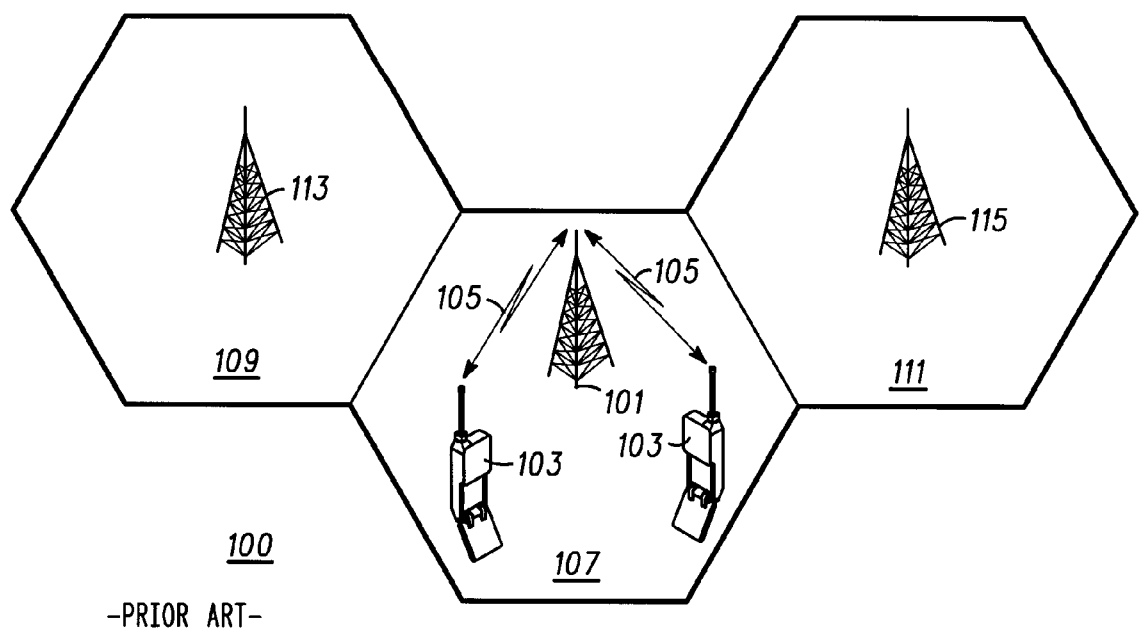
FIG. 1 is an illustration of a cellular communication system according to prior art.
Figure 2:
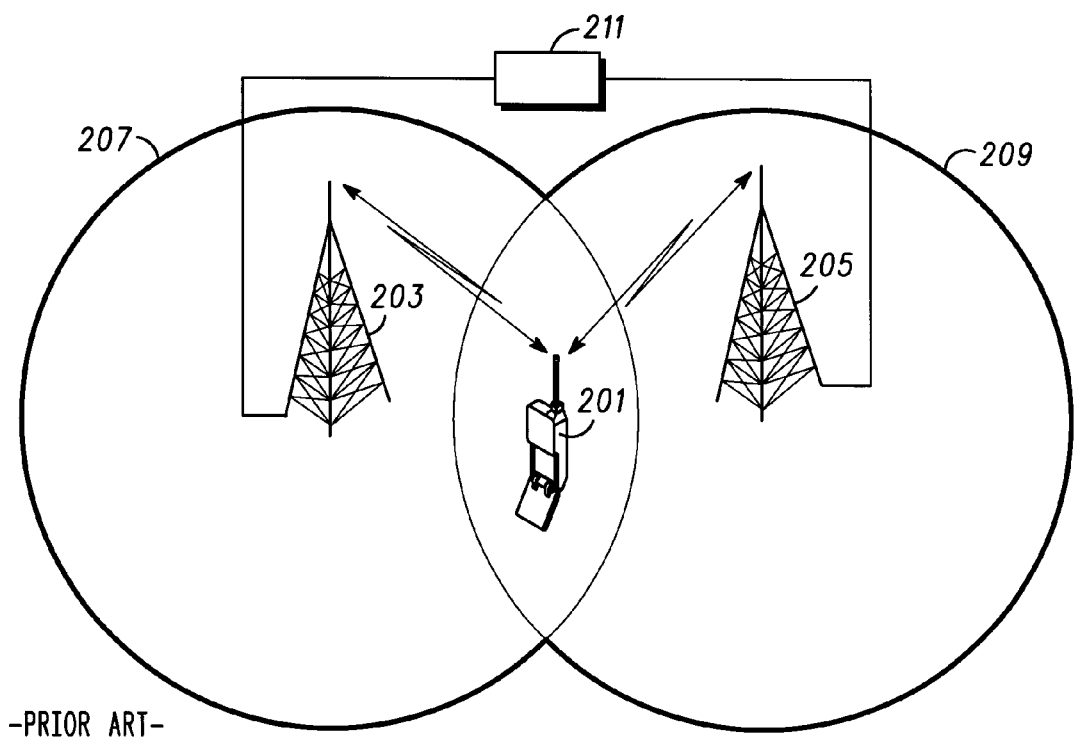
FIG. 2 is an illustration of a soft handover in a CDMA communication system according to prior art.
Figure 3:
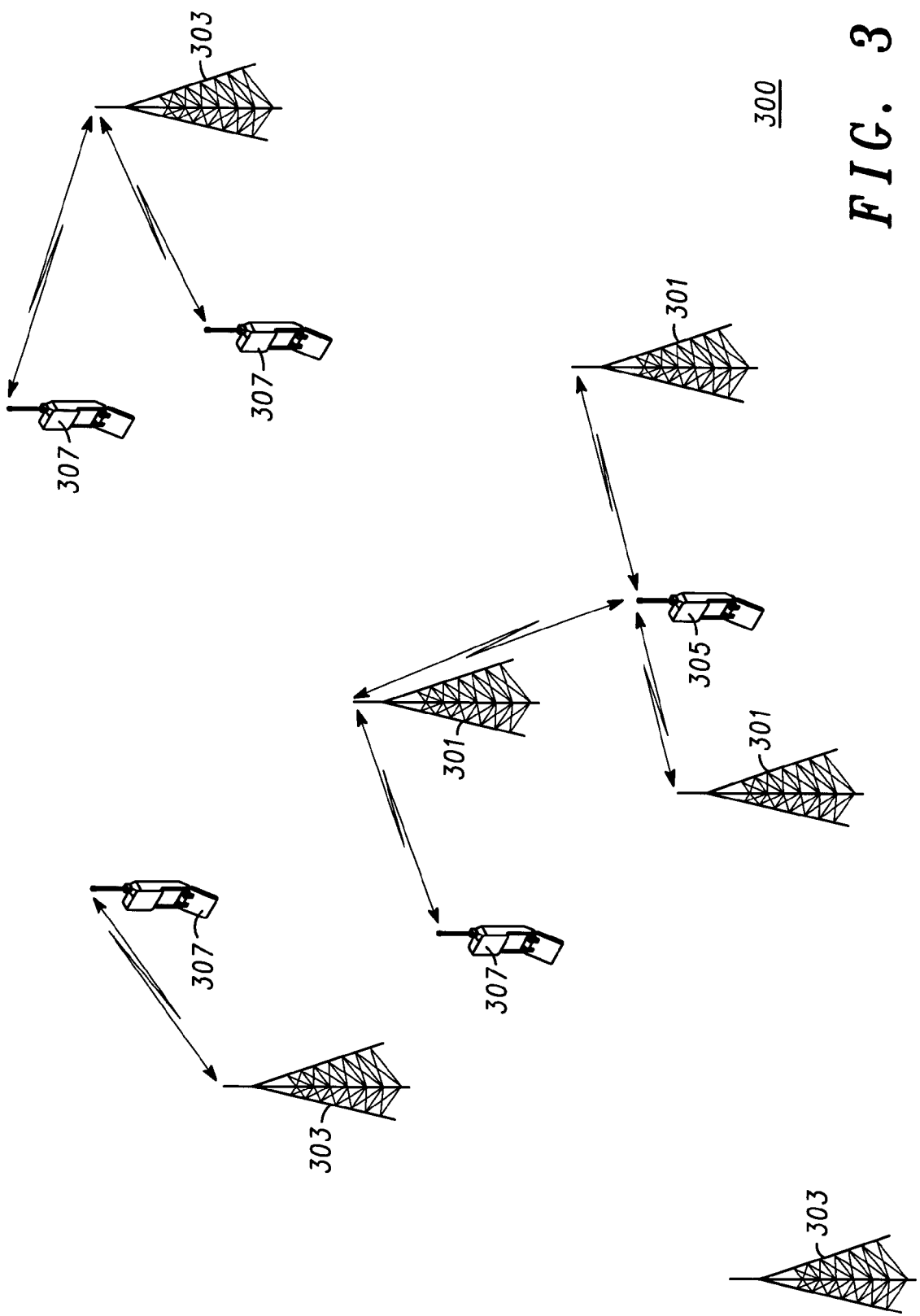
FIG. 3 is an illustration of a CDMA communication system to which the invention is applicable.

FIG. 3 illustrates a UMTS communication system 300 to which the present invention is applicable. The communication system 300 comprises a large number of base stations 301, 303 serving a large number of user terminals 305, 307. Typically, the base stations 301,303 will each cover a different geographical area although these areas typically will overlap. The base stations 301, 303 support a large number of user terminals 305, 307 over radio channels 309, each user terminal 305,307 mainly being supported by the most appropriate base station 301,303 which is often the closest base station 301,303. When handing over from one cell to another, the user terminal 305, 307 may simultaneously be served by a plurality of base stations 301,305. This is known as a soft handover and is illustrated in FIG. 3, where the user terminal 305 is in soft handover with the base stations 301. The base stations suitable for a soft handover are in UMTS known as an active set.

In a soft handover, the signals received from the user terminal 305 at each of the base stations 301 are typically relayed to combining means 211 via the fixed network. The combining means combines the plurality of signals and generates the received data sequence. In the downlink, the plurality of signals received from the base stations 301 are combined in the user terminal 305.

Figure 4:
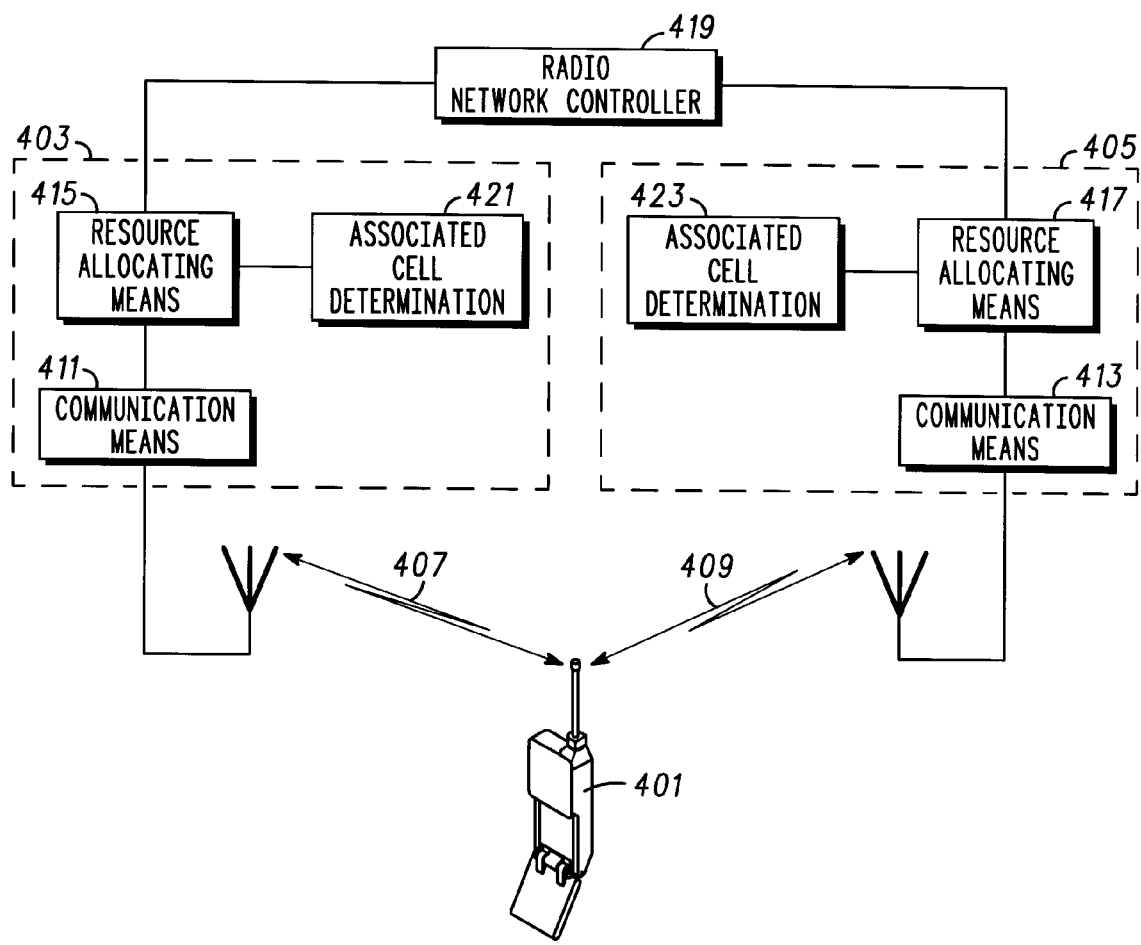
FIG. 4 is an illustration of an embodiment of a communication network in accordance with the present invention.

FIG. 4 illustrates an embodiment in accordance with the current invention. In this embodiment, the user terminal 401 is in soft handover with two base stations 403,405 and communicates with these over communication links 407, 409, which in this case are radio communication links. Each base station contains communication means 411, 413 operable to carry a communication channel over the radio communication links. These communication channels can be logical or physical communication channels, and the radio communication links can consist of one or more communication channels.

In the described embodiment, the communication channels of the base stations are shared between a plurality of user terminals. In UMTS, a shared channel can be implemented by using the same spreading code for a plurality of user terminals and using time division multiple access for using this code. More information of the shared channel concept can be found in for example "ETSI (European Telecommunication Standards Institute) SMG2 UMTS L23 533/98 'Shared channel options for downlink packet data transmission' and ETSI SMG2 UMTS L23 Tdoc 535/198 'Mechanisms for managing uplink interference and bandwidth'".

Each base station furthermore comprises resource allocating means 415,417 operable to control the allocation of resource to different user terminals. Specifically, for a CDMA shared channel the resource allocating means 415, 417 will allocate time intervals on the same spreading code to different user terminals in accordance with a number of rules, and in response to the resource requirements for different user terminals. However, the resource being allocated will depend on the specific embodiment of the invention and can be any shared resource including CDMA spreading codes, time, power, interference, transceiver means etc.

The base stations are furthermore part of the fixed network and thus interconnected. In the example of FIG. 4, the two base stations 403,405 are both connected to a radio network controller 419, which controls the configuration of the base stations 403,405 and route data to and from the appropriate base stations 403, 405.

Allocation of resource in a cellular communication system is a complicated process as allocation by one base station can affect the resource allocation in a cell served by a different base station. This is specifically problematic for soft handovers where allocation of resource to a user terminal must be coordinated for all base stations taking part in the soft handover. The problem is increased for a shared channel where allocation of a time interval in a given shared channel requires that the same time interval is allocated in the other base stations involved in the handover. This will affect the time intervals that can be allocated to other user terminals by these base stations.

In the described embodiment of the current invention, the communication system also comprises means for determining an associated resource allocating means being the resource allocating means primarily associated with a given user terminal and/or resource requirement. In accordance with the embodiment of the invention a user terminal in soft handover will thus be specifically associated with one associated resource allocating means situated in an associated base station serving an associated cell.

In FIG. 4 each base station comprises means for determining an associated resource allocation 421,423 but it will be clear that the means 421,423 can be located in the base stations, anywhere in the communication system (including the user terminal) or can be distributed in the system. Furthermore, the means can be distributed between several base stations as shown, or there can be a single means for determining an associated resource allocation 421,423 which determines and associated cell and communicating this result to the relevant base stations. In the shown example, the means for determining an associated resource allocation 421,423 work by receiving a received signal level measurement of the user terminal 401 from all base stations involved in a soft handover and choosing the cell having the highest signal level as the associated cell. In this case the signal level measurements must be communicated between the base stations but each base station can on the basis of these measurements independently determine whether they are the associated base station or not.

The associated base station is determined for the specific resource requirement and user terminal. For example, if a user terminal requires one time slot to be allocated in a communication channel for transmission of a single packet of data, the associated cell can be determined for that user terminal and that packet. The associated cell is thus typically a dynamic concept, which changes in response to the conditions of the communication system.

The associated cell for a given user terminal or resource requirement can be determined in response to a number of different parameters. The preferred approach is that the associated base station is chosen as the best serving base station. The best serving base station is the base station, which is best suited to support a communication link with the user terminal. Specifically, the best serving base station can be determined as the base station having the best downlink pilot signal. The concept of determining a best serving base station is well known from cellular communication systems, and any known method of determining the best serving base station can be substituted without subtracting from the current invention.

Alternatively, when a user terminal enters a soft handover mode the associated base station is chosen as the base station that was originally supporting the user terminal prior to entering the soft handover mode. A third alternative is to choose the associated base station as the base station, which offered the highest performance soft handover branch to the user terminal, when this was last in soft handover mode.

The resource allocating means in the base station associated with e.g. a given user terminal will perform an allocation of resource to the user terminal without consideration of resource allocation in other resource allocating means. It will thus consider the user terminals being served by base station hard handover and all user terminals in soft handover and associated with the base station. The resource allocating means in the base stations not associated with the user terminal will initially perform a resource allocation without considering allocation of resource to the given user terminal. The associated base station will subsequently communicate information on the resource allocation to all base stations involved in the soft handover for the user terminal, and upon receiving this information the non-associated base stations will update their resource allocation so as to support the user terminal according to the resource allocation of the associated base station.

The communication of the resource allocation information will preferably be through the fixed network. If, as is shown in FIG. 4, the base stations 403,405 are connected through the same radio network controller the communication can be through this controller or indeed both resource allocating means may be implemented in the same radio network controller and no communication through the fixed network is required. If the base stations are not connected to the same radio network controller the communication must be through the fixed network as appropriate.

Figure 5A:
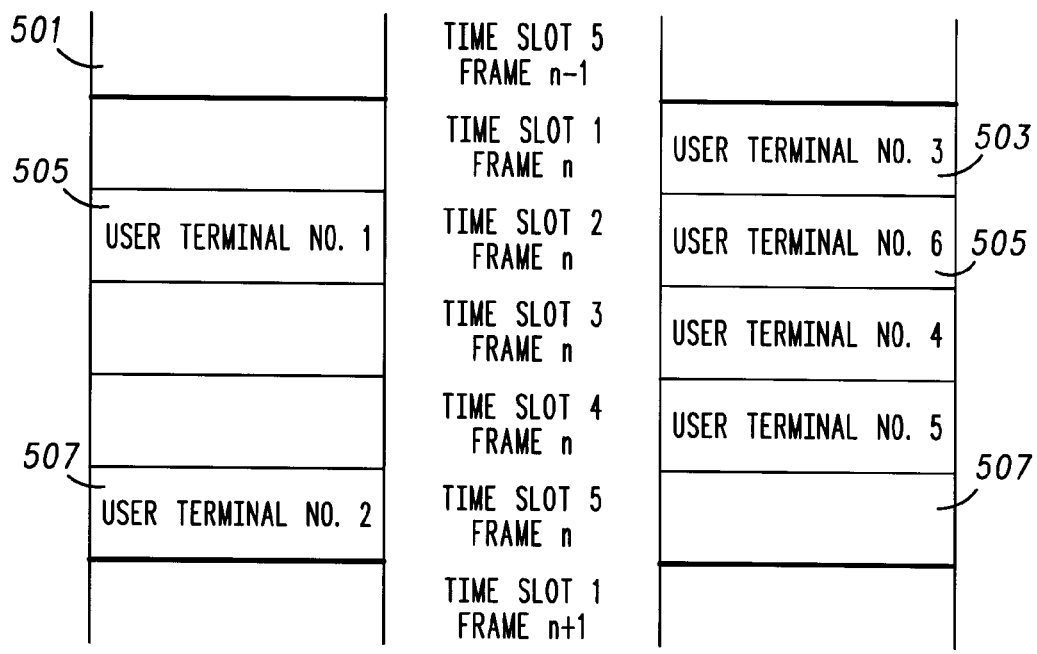
FIG. 5 illustrates an example of a resource allocation in accordance with the present invention.
Figure 5B:
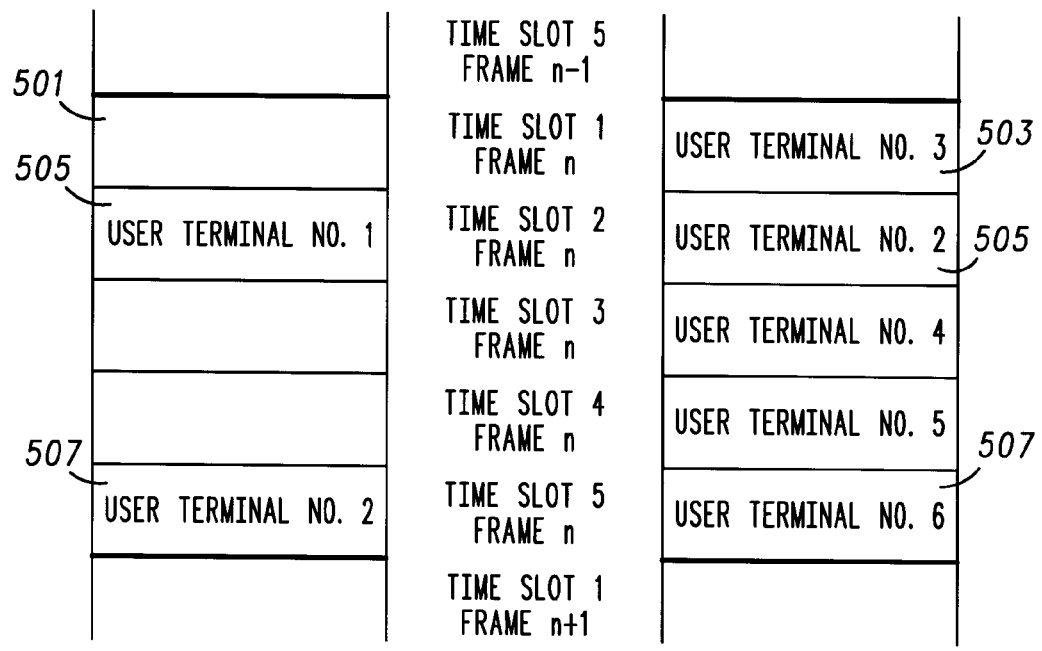

FIG. 5 shows specific example of a resource allocation 500 in the described embodiment. In the example a first base station communicates with a number of mobile terminals through a shared communication channel 501 whereas another base station communicates with a plurality of user terminals through a different shared communication channel 503. In the shown example, each communication channel 501,503 consists of a number of time frames with each time frame having five identical time slots. A first user terminal is in soft handover between the two base stations, and a time slot allocated to this user terminal should thus preferably be allocated simultaneously in the two communication channels. In the example, the first base station is determined as the associated base station, and the first shared communication channel 501 is thus the associated communication channel. FIG. 5a shows the initial resource allocation by the resource allocating means in the two base stations. The associated base station supports two user terminals and has allocated time slot 2 505 and time slot 5 507 respectively. This allocation is performed without consideration of resource requirements in other cells. The non-associated base station supports four other user terminals as shown in FIG. 5a. As it is not the associated base station of the first user terminal it has made an initial resource allocation without consideration of this user terminal. Subsequently, the resource allocation of the associated base station is communicated to the non-associated base station. The non-associated base station updates the resource allocation in response to this in order to accommodate the resource required for supporting the first user terminal. In the shown example, the non-associated base station will move the user terminal 6 from time slot 2 505 to timeslot 5 509, thereby making room for user terminal in time slot 2 505 (Ref. FIG. 5b).

In the embodiment, the resource allocation for a given frame is performed in the previous frame, and the resource allocation is communicated to the user terminals on broadcast channels. The user terminals are operable to demodulate the broadcast channels and decode the resource allocation data. In the described example, the resource allocation is in terms of allocation of time slots to user terminals, but it will be apparent that the invention is applicable to many other resource allocation means, including allocation of time intervals of varying duration and starting time. The example furthermore showed synchronisation between the base stations but the invention can also be applied in a non-synchronous environment.

In the described embodiment, the update of the resource allocation in order to accommodate the first user terminal was achieved by removing a user terminal from the desired time slot to an unused time slot. In some cases there will be a higher resource requirement than available resource and in this case the resource allocating means will include means for prioritising between the resource requirements. One method of prioritisation is for the resource only to be allocated for soft handover user terminals when resource is available. In this case, the user terminal may thus enter a hard handover mode as a consequence of insufficient resource in the base stations supporting the soft handover. In a different scheme, preference may be given to user terminals in soft handover mode and hard handover user terminals thus only be allocated if there is available resource.

In the given example, if time slot 5 507 had already been occupied, then depending on the priority of the different resource requirements time slot 2 505 could have been allocated to the first user terminal or the originally allocated user terminal could have retained the allocation. Alternatively, the user terminal occupying time slot 2 505 could be moved to the time slot for the user terminal having the lowest priority thereby permitting the first user terminal to be supported in preference to the lowest prioritised user terminal rather than the user terminal which happened to be allocated in the desired time slot. Any known suitable prioritisation scheme can be used without detracting from the invention.

The invention is applicable to both the uplink and downlink of a cellular communication system. In the downlink, the resource allocation in the communication channel will typically consist in data packages, which are transmitted by different base stations to be received by the same user terminal. The user terminal will then combine the received signals as is well known in the art.

In the uplink the user terminal will typically only transmit one message which can be received by a plurality of base stations. In this case the base stations taking part in the soft handover can allocate the receiving resource to the given user terminal or may choose to reject the data package from the user terminal and focus the receiving resource on a different user terminal. In this example, the resource being allocated thus include the receiving resource of the base stations.

One significant advantage of the described embodiment is that the algorithms for resource allocation and determination of associated cells can be identical in all base stations. All base stations can thus perform the same algorithm and procedure for scheduling of resource and determination of associated base station status. The invention thus enables a distributed and low complexity approach to resource allocation. When signalling is required across the network it requires only a message from one resource allocating means to another, and visa versa, a stream of messages is not necessary. Furthermore, it should be noted that the invention is not limited to shared channels but may be applied with benefit to allocation of resource by other means, for example, in dedicated channels (DCH). Thus a low complexity, fair and efficient means of scheduling resource to allow the many benefits of soft handover to be realised has been invented.

What we claim is:

1. A communication network comprising
    first resource allocating means for allocating resource in a first communication channel;

second resource allocating means for allocating resource in a second communication channel;

first communication means for providing a communication link for the first communication channel to at least one user terminal;

second communication means for providing a communication link for the second communication channel to at least one user terminal;

a first user terminal using both communication links for communication;

means for designating one of the first or second resource allocating means as an associated resource; and wherein said associated resource allocating means performs a first allocation of resource to said first user terminal without consideration of resource allocation in other resource allocating means and in which the resource allocating means not being associated resource allocation means subsequently performs a resource allocation to the first user terminal in response to the first resource allocation of the associated resource allocation means.

2. A communication network as claimed in claim 1, wherein the resource allocating means not being associated resource allocation means perform an initial resource allocation not considering resource allocation for the first user terminal, and the resource allocation to the first user terminal in response to the first resource allocation of the associated resource allocation means consist in modifying this initial resource allocation.

3. A communication network as claimed in claim 1, wherein the first and second resource allocation means use substantially identical resource allocation algorithms.

4. A communication network as claimed in claim 1 wherein the first and second communication channels use discontinuous data transmission.

5. A communication network as claimed in claim 1, wherein the communication network is a CDMA cellular communication network.

6. A communication network as claimed in claim 5 wherein each resource allocating means allocates resource for a communication channel associated with a single base station.

7. A communication network as claimed in claim 5, wherein at least the first communication channel is a shared channel between a plurality of user terminals.

8. A communication network as claimed in claim 5, wherein the associated resource allocating means are identified as those resource allocating means which allocate resource for the best serving base station.

9. A communication network as claimed in claim 5 wherein the first and second resource allocating means allocate resource for uplink communication channels.

10. A communication network as claimed in claim 5 wherein the first and second resource allocating means allocate resource for downlink communication channels.

11. A communication network as claimed in claim 5, wherein the first and second resource allocating means are located in different radio controllers and the resource allocation of the associated resource allocating means is communicated to other resource allocating means over a fixed network.

12. A communication network as claimed in claim 5 wherein the first user terminal is in soft handover.

13. A communication network as claimed in claim 12, wherein the associated resource allocating means are identified as those resource allocating means which allocate resource for the base station serving the first user terminal prior to entering soft handover.

14. A method of allocating resource in a communication network having first resource allocating means for allocating resource in a first communication channel; second resource allocating means for allocating resource in a second communication channel; first communication means for providing a communication link for the first communication channel to at least one user terminal; second communication means for providing a communication link for the second communication channel to at least one user terminal; and a first user terminal using both communication links for communication; the method comprising the steps of:

designating one of the first or second resource allocating means as an associated resource;

in said associated resource allocating means performing a first allocation of resource to said first user terminal without consideration of resource allocation in other resource allocating means communicating the first allocation of resource to the resource allocating means not being associated resource allocation means; and in the resource allocating means not being associated resource allocation means performing a resource allocation to the first user terminal in response to the first resource allocation of the associated resource allocation means.

15. A method of allocating resource as claimed in claim 14 further comprising the step of determining an initial resource allocation in the resource allocating means not being associated resource allocation means not considering resource allocation to the first user terminal.

\* \* \* \* \*